1,074,055.

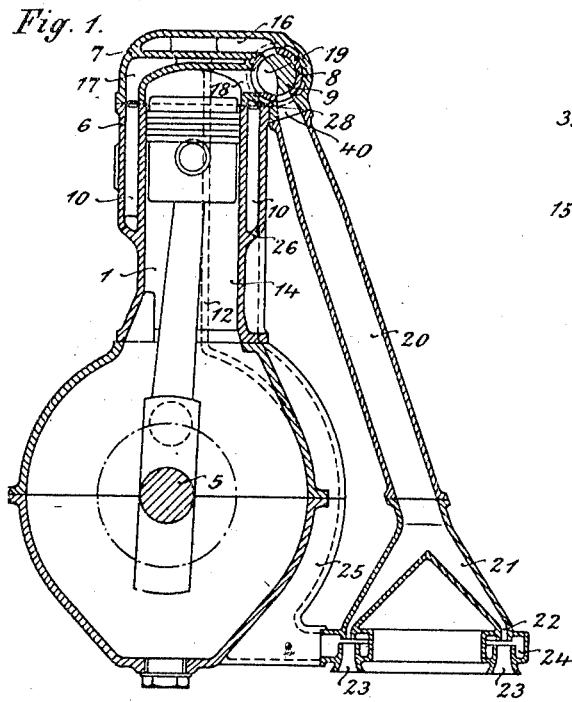
H. LENTZ.
MULTICYLINDER INTERNAL COMBUSTION ENGINE.
APPLICATION FILED NOV. 16, 1912.
1,074,055.  Patented Sept. 23, 1913.
4 SHEETS—SHEET 1.
Witnesses:
Inventor:
Hugo Lentz
represented by H. LENTZ.
MULTICYLINDER INTERNAL COMBUSTION ENGINE.
APPLICATION FILED NOV. 16, 1912.

Patented Sept. 23, 1913.
4 SHEETS—SHEET 2.

Witnesses:
P. A. Putnam
L. E. Tarkley

Inventor:
Hugo Lentz.
represented by
Franks Ankleman, atty.

H. LENTZ.
MULTICYLINDER INTERNAL COMBUSTION ENGINE.
APPLICATION FILED NOV. 16, 1912.
1,074,055.
Patented Sept. 23, 1913.
4 SHEETS—SHEET 3.
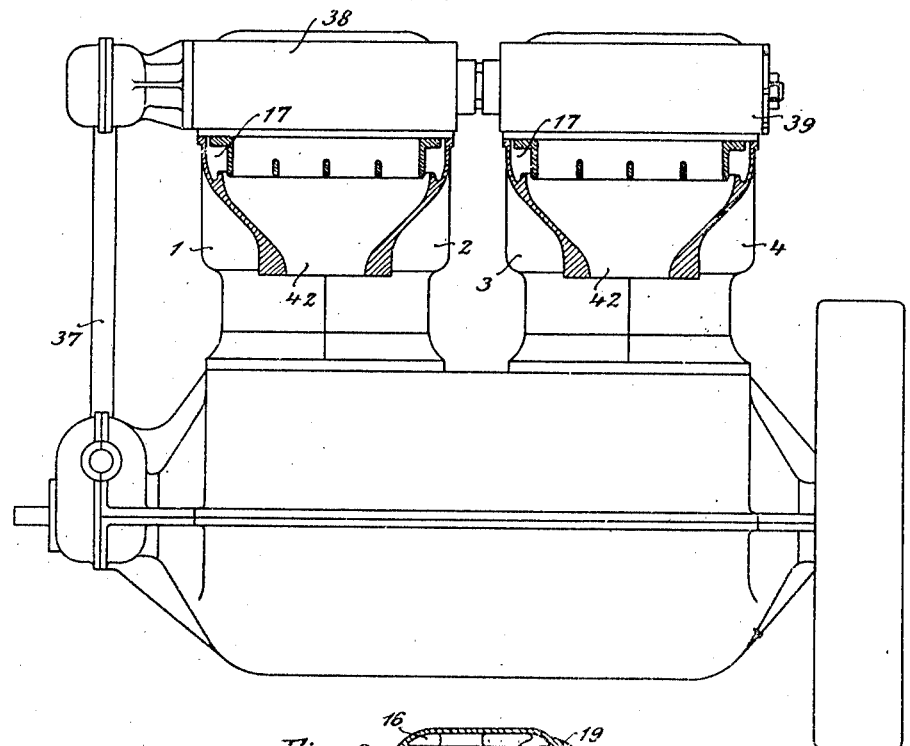
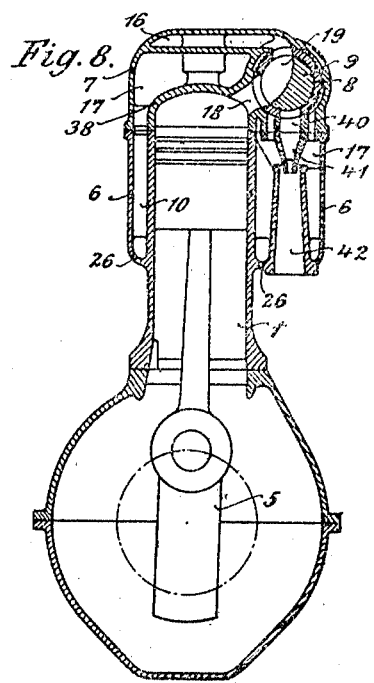
Witnesses:
Inventor:
Hugo Lentz
represented by H. LENTZ.
MULTICYLINDER INTERNAL COMBUSTION ENGINE.
APPLICATION FILED NOV. 16, 1912.

1,074,055.

Patented Sept. 23, 1913.

4 SHEETS—SHEET 4.

Witnesses:

Inventor:
Hugo Lentz
represented by

UNITED STATES PATENT OFFICE.

HUGO LENTZ, OF HALENSEE, NEAR BERLIN, GERMANY.

MULTICYLINDER INTERNAL-COMBUSTION ENGINE.

1,074,055.  Specification of Letters Patent.  Patented Sept. 23, 1913.

Application filed November 16, 1912. Serial No. 731,668.

*To all whom it may concern:*

Be it known that I, HUGO LENTZ, a citizen of the German Empire, and residing at Halensee, near Berlin, Germany, have invented certain new and useful Improvements in Multicylinder Internal-Combustion Engines, of which the following is a specification.

My invention relates to an internal combustion engine provided with rotary valve gear, in which the waste gases are utilized for sucking cool air through the chambers to be cooled.

According to my invention the arrangement is such that the chambers traversed by the cooling air directly surround the combustion chambers and the slide valve casing, while a gas chamber extending above all the cylinders is arranged around these cooling chambers. By means of such a superposition of the two chambers I obtain the advantage that the hottest parts of the cylinder are first cooled by an indifferent gas which is itself aided in its cooling action during the cooling process by delivering heat to the combustible gases. In this manner not only can the cylinders and the valve casing be simultaneously cooled exceedingly effectively, but the combustible mixture itself is utilized within suitable limits for cooling, the more so as direct contact of the gaseous mixture with the walls of the cylinders is not suitable here on account of the high temperature of the latter.

Various forms of four-cylinder, four-stroke cycle, internal combustion engines embodying my invention are represented by way of example in the accompanying drawings, wherein—

Figure 6:
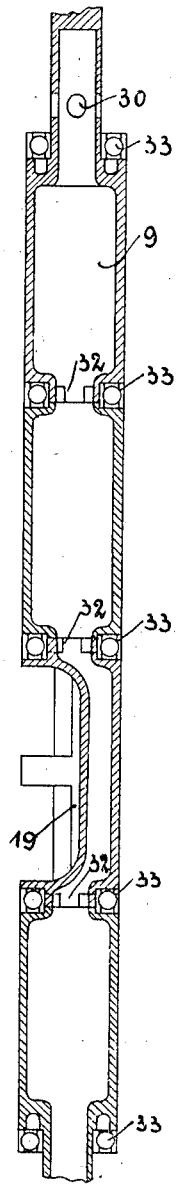
Figure 7:
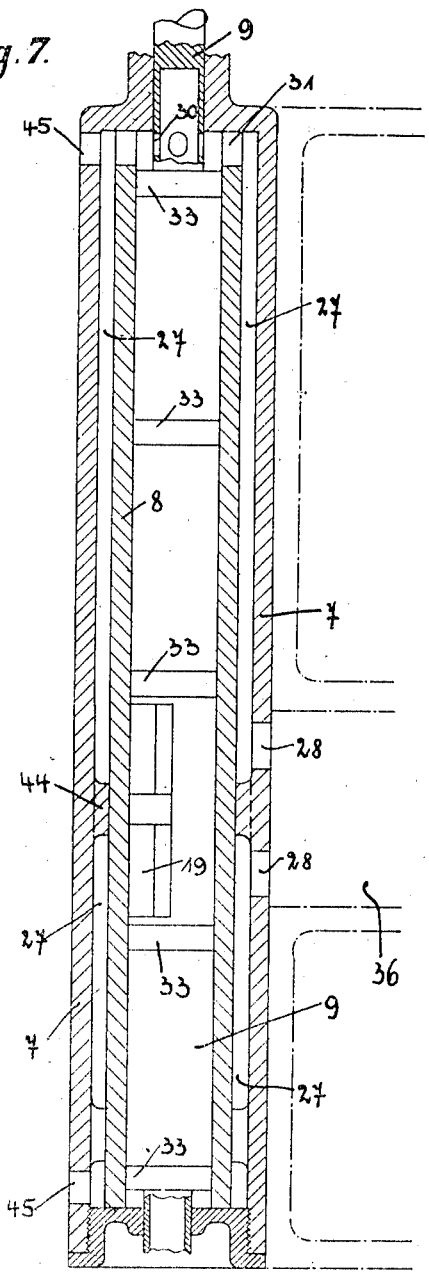
Figure 10:
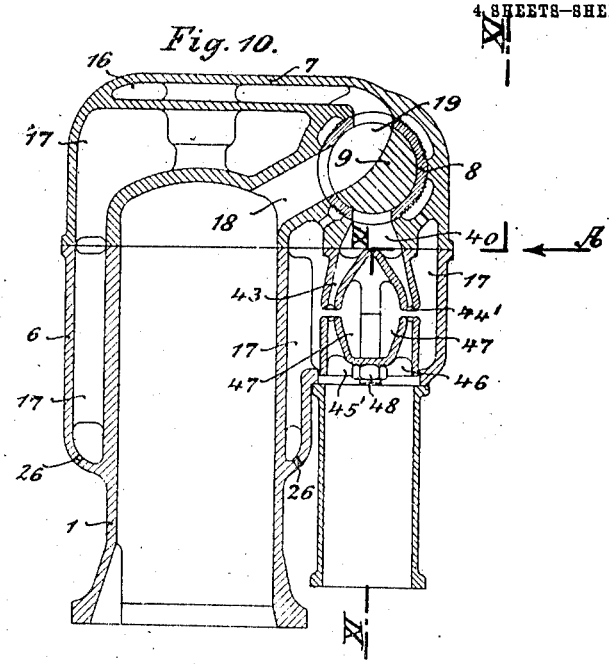
Figure 11:
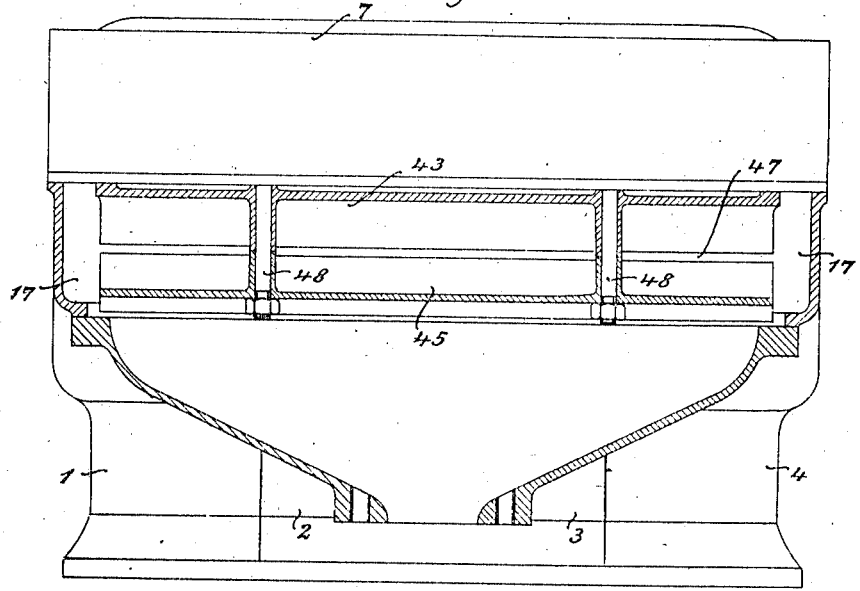

Figure 1 is a vertical cross-section through one of the cylinders in one form of engine; Fig. 2 is a longitudinal section through the cylinder heads taken on the bent line II—II in Fig. 3; Fig. 3 is a horizontal sectional view corresponding to the line III—III of Fig. 2. Fig. 4 is a section taken on the line IV—IV in Fig. 3; Fig. 5 is a cross-section, enlarged, and Fig. 6 a longitudinal section, enlarged, through the rotary valve, while Fig. 7 is a longitudinal section, enlarged, showing the means for cooling the latter; Figs. 8 to 11 show two other forms of engine, Fig. 8 being a vertical cross-section through one of the cylinders and the suction device, and Fig. 9 is the corresponding side elevation, partly in section, showing the one form; Fig. 10 is a section through the cylinder of the other form, and Fig. 11 is a section taken on the bent line XI—XI in Fig. 10 as seen in the direction of the arrow A.

Referring firstly to Figs. 1 to 4, the engine cylinders 1, 2, 3 and 4, whose pistons work in the usual manner on a crank-shaft 5, are cast in one piece. Their upper part is surrounded by a wall 6 in such manner that a cooling jacket is formed. The cylinder head 7, likewise consisting of one piece, is mounted over the cylinders, and the valve 9, which is constantly rotated by the engine shaft 5 by means of gearing 37 represented in Fig. 9, is mounted in an inserted casing 8.

Between the cylinders and the outer wall 6 a number of ribs 10 for conducting away the heat are arranged in such manner that a corresponding number of chambers are formed which are connected through openings 26 with the atmosphere. In addition, between the two middle cylinders 2 and 3 and the outside wall 6 are arranged partitions 11 and 12 which extend through the jacket chamber on both sides (Fig. 3), whereby two separate chambers 13 and 14 are formed. The supply of fuel is connected to the former chamber by means of a pipe connected to the opening 15 (Fig. 4).

The cylinder head 7 is divided into two chambers 16 and 17. The upper chamber 16 extends over all the cylinders. It is permanently connected with the chamber 13, thus with the supply of fuel, by way of a channel 35, whose side walls constitute the extension of the walls 11 in the cylinder head 7 (cf. Figs. 2 and 4). By this arrangement of the gas chamber I obtain that on the one hand the gaseous mixture contributes toward the cooling of the cylinder head by withdrawing heat from the cooling air and thus increasing its capability of absorbing heat, and, on the other hand the gaseous mixture is very advantageously preliminarily heated.

The chamber 17 located below surrounds the combustion chambers of all the engine cylinders and is connected in the manner which will be understood from Figs. 1 and 2 with the cooling jacket chamber of the engine cylinders. In addition, the chamber 17 is connected with the chamber 14, which may be called the suction chamber for reasons stated subsequently, by a channel 36 whose side walls form the extension of the walls 12. The combustion chambers of the individual engine cylinders are formed for the most part by suitable spaces in the lower wall of the cylinder head. They can be connected by suitable ports or ducts 18 and recesses 19 provided in the rotary valve 9 either with the gas-supply chamber 16 or with the exhaust pipe 20.

A nozzle 21 having an annular outlet 22 is connected to the exhaust pipe 20. This outlet is located opposite a suction nozzle 23. The outlet 22 and the inlet of the nozzle 23 is surrounded by an annular channel 24 which is connected by a channel 25, cast on the crank-case, with the suction chamber 14 and consequently also with the chambers to be cooled.

The mode of action of the above-described form of the invention is as follows, only one of the cylinders being considered at first: When the gaseous mixture is sucked in the valve 9 is so located that its chamber 19 establishes a connection between the gas chamber and the engine cylinder. When it rotates farther the valve closes and the compression stroke and, subsequently the explosion stroke take place. During the exhaust period which now begins the valve establishes a connection of the cylinder with the exhaust pipe 20, so that the waste gases are ejected through the pipe 20 and the nozzle 22 with a great velocity and in the form of an exceedingly fine annular jet. Owing to the injector-like action a pressure below atmospheric is produced in the channel 24, so that the cold outer air enters through the openings 26 into the cooling jacket, traverses the individual chambers in the cylinders and in the cylinder head, cools these and is sucked away through the channel 24 and the nozzle 23. The entire engine is thereby cooled exceedingly favorably. As the individual chambers of the four cylinders are always connected, however, and always one of the cylinders is being exhausted, the air is constantly driven through the chambers to be cooled. In addition, owing to the velocity of the issuing jet of gas being directly dependent on the quantity of the exhaust gases and consequently on the performance of the engine and the necessity of the same being cooled, the suction action and the change of air in the cooling jacket are also in direct dependence on the performance of the motor. Owing, on the other hand, to the gas jet issuing in the form of a thin-walled tube, it penetrates like a blade and without considerable resistance into the air in front of the nozzle without rebounding from the same. Consequently, the gas issues noiselessly, so that the otherwise necessary silencer which causes a not immaterial increase of the counter pressure in the cylinder, thus a diminution of the efficiency, is entirely done away with. The openings 26 are made relatively small so that the entering air must expand first in the cooling chamber.

A more intensive cooling is thereby obtained because the air becomes colder owing to its instantaneous expansion. According to the present invention, however, the cooling chamber extends over the valve casing containing the rotary valve. For this purpose the valve casing is constructed as follows: The rotary valve is mounted in a special bushing 8 which is inserted in such manner in the cylinder head 7 that free chambers 27 are formed between the walls of the head and the bushing, which chambers surround the bushing for the most part but are separated from one another in the middle by a rib 44. These chambers are connected on the one hand with the atmosphere through openings 45 at the ends of the bushing 8 and, on the other hand, with the channel 36 through openings 28 at the middle of the bushing. Owing to the suction action of the exhaust gases cold air is therefore sucked in through the openings 45 and flows around the outside of the bushing and therefore likewise effectively cools it and is sucked away through the openings 28. Of course the ports 45 and 28 may be arranged as desired. It is only essential that the chambers 27 surrounding the bushing 8 be connected, on the one hand, with the atmosphere and, on the other hand, with a chamber in which there is a pressure below atmospheric. This could therefore be the cooling jacket chamber. In order that this cooling may be specially effective the faces of the bushing 8 bounding the chambers 27 are provided with ribs 29 by which the heat is conducted away more rapidly. In like manner, the hollow slide valve 9 may also be cooled from within. For this purpose, the one end of the same is connected with the atmosphere (cf. Figs. 6 and 7) while the other, closed end is connected by bores 30 and 32 of the valve and ports 31 with the annular chambers 27 which are connected in the above described manner to the suction device. The interior of the valve 9 is therefore effectively cooled by the sucked in outer air. In this manner provision is made that not only is the valve cooled within, but its bushing is cooled directly from the outside by the same cooling agent and, consequently, perfectly uniformly, so that the temperature conditions on the two sides are always the same, whereby warping or twisting of the valve and disturbances in working are completely avoided.

The rotary valve is provided with circumferential grooves forming seats for ball bearings on 33 which facilitate a free rotary movement of the valve proper.

In the engine represented in Figs. 8 and 9 each two cylinders 1, 2 and 3, 4 are cast together and provided with conjoint heads 38 and 39. Otherwise the arrangement of the gas chamber 16, of the cooling chamber 17 and also of the rotary valve 9 are the same, with the exception of the suction device, as in the engine according to Figs. 1 to 4.

Now according to my invention the suction device is formed by the outer cylinder wall 6 being enlarged immediately under the rotary valve casing and so constructed that a delivery nozzle 41, which is opposite a suction nozzle 42 connected through slots with the cooling jacket chamber 17, is connected directly to the exhaust port 40 in the valve casing. In this arrangement the exhaust gases can escape directly out of the cylinders through the nozzles 41 and 42. They therefore possess in addition a high initial temperature and consequently a higher pressure, so that the energy in the waste gases is favorably utilized, the more so as in this case the cooling jacket chamber simultaneously surrounds the suction and delivery nozzles. The cross-section of the exhaust nozzle extending over several cylinders has only the exhaust section necessary for one cylinder, because the exhaust from one cylinder can always extend over the entire nozzle. An exceedingly simple and compact construction of the entire engine is thereby obtained.

In the engine according to Figs. 8 and 9 each two cylinders are provided with a simple suction nozzle which extends over both cylinders and the entire length of the valve. As shown in Fig. 11, however, the suction device may extend over all the engine cylinders, it being connected directly to the exhaust port in the rotary valve casing.

Fig. 10 shows another form of the suction device which is characterized by two delivery nozzles 43 and 44' with opposite suction nozzles 45' and 46 being arranged below the rotary valve. Both nozzles inclose between them a chamber 47 connected at its two ends with the cooling chamber 17. In this manner the cooling air can flow not only from without, but also from within to the two suction nozzles, whereby a greater cooling action is obtained with an equally simple construction of engine. The nozzles are constructed as separate parts and are connected by screws 48 with the valve casing.

I claim:—

1. In an internal combustion engine having a cylinder housed by a cooling chamber, said cylinder having an intake and exhaust port, a fuel passage disposed adjacent to said cooling chamber, a valve having a cooling chamber, the cooling chamber of the valve being in communication with the cooling chamber of the cylinder, said valve being positioned on the cylinder to deliver fuel from the fuel passage to the cylinder and to exhaust gases from the cylinder, and means in communication with the exhaust port whereby the exhaust gases create a circulation of air through the chambers.

2. In an internal combustion engine having cylinders partially housed by a cooling chamber, each of said cylinders having an intake and exhaust port, a fuel passage disposed adjacent to said cooling chamber, a rotary valve having a cooling chamber, said valve being positioned on the cylinders to deliver fuel from the fuel chamber to the cylinders, and the exhaust gases from the cylinders, partitions in the cooling chambers of the cylinders for providing compartments, each compartment having means for admitting air thereto, and means in communication with the exhaust port whereby the exhaust gases create a circulation of air through the chambers.

3. In a multi cylinder internal combustion engine, each of the cylinders having a common intake and exhaust port, and a cooling chamber surrounding the cylinders, a fuel passage disposed adjacent to said cooling chamber and above the head of the cylinders, a rotary valve having a cooling chamber in communication with the cooling chamber of the cylinders, said valve being mounted to control communication between the fuel passage and the cylinders, and between the cylinders, and exhaust ports, and means in communication with the exhaust ports whereby the exhaust gases create a circulation of air through the chambers.

4. In an internal combustion engine having a common intake and exhaust port, and a cooling chamber surrounding the cylinder, a fuel passage disposed adjacent to said cooling chamber, a valve jacket adjacent the cylinders, a valve operating in the jacket, said valve controlling communication between the fuel passage and the engine cylinder, and between said cylinder and the exhaust port, a bushing between the jacket and valve, means for holding the bushing in spaced relation with the jacket for providing a valve cooling chamber, and means in communication with the exhaust port whereby the exhaust gases create a circulation of air through the chambers.

In testimony whereof, I affix my signature in the presence of two witnesses.

HUGO LENTZ.

Witnesses:
HENRY HASPER,
WOLDEMAR HAUPT.